Dec. 9, 1969  J. W. ROSS  3,483,112
ANION SENSITIVE ELECTRODE
Filed Feb. 23, 1968

INVENTOR
JAMES W. ROSS
BY
Robert J. Schiller
ATTORNEY

United States Patent Office 3,483,112
Patented Dec. 9, 1969

3,483,112
ANION SENSITIVE ELECTRODE
James W. Ross, Newton, Mass., assignor to Orion Research Incorporated, Cambridge, Mass., a corporation of Massachusetts
Filed Feb. 23, 1968, Ser. No. 707,802
Int. Cl. B01k 3/00
U.S. Cl. 204—195
8 Claims

ABSTRACT OF THE DISCLOSURE

An electrode particularly sensitive to $ClO_4^-$, $Br^-$, $I^-$, $NO_3^-$, and $ClO_3^-$ ions in solution and comprising, as the ion-sensitive portion, a body of ion-exchanger liquid formed of a salt of a metal-organic ligand complex dissolved in a water-immiscible solvent, e.g., nickel$^{II}$ tris bathophenanthroline nitrate in paranitrocymene.

---

Figure 1:
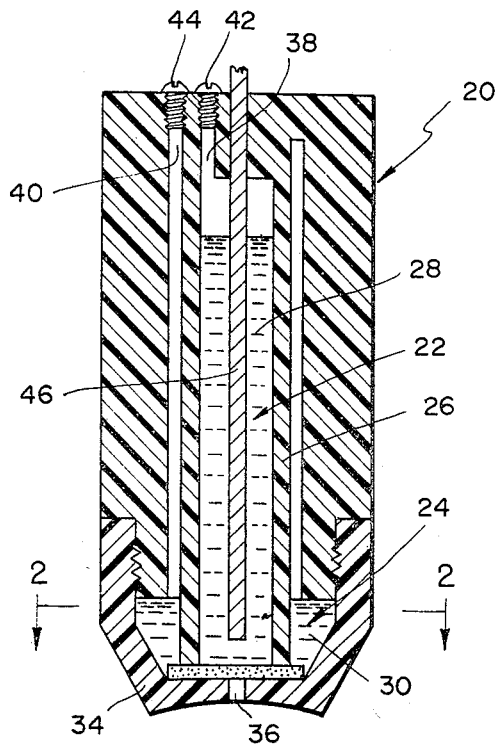

This invention relates to electrochemical detection and measurement, and more particularly to the determination of a number of anions and apparatus therefor.

The activity or concentration of ions in solution have long been determined by a known technique involving an ion-sensitive electrode and a reference electrode both in contact with the solution under test. These electrodes each constitute electrochemical half-cells. Because the half-cell potential of the reference electrode is substantially constant at a fixed temperature and the half-cell potential of the ion-sensitive electrode varies with the activity of the ions in the test solution according to the Nernst equation, the total cell potential is then a function of the ion activity and can be readily ascertained as with a potentiometric measuring device.

A known ion-sensitive electrode of the foregoing type has a structure wherein an ion-sensitive surface is defined by a body of ion-exchange liquid, for example, a salt of a phosphoric acid ester dissolved in decanol, which is substantially immiscible with water. Such electrodes, described in Belgian Patent No. 688,409, are particularly useful for detecting divalent cations such as $Ca^{++}$ and $Mg^{++}$.

The detection and measurement of activity of anions such as $F^-$ and $S^=$ has been accomplished potentiometrically, but the devices involved do not employ ion-exchange liquids and are quite specific for these ions. To detect other ions such as nitrate and the like, the usual techniques are still chemical tests such as colorimetric titrations and the like. Such techniques do not lend themselves readily to process monitoring in real time and are necessarily destructive at least to small samples.

A principal object of the present invention is to provide means for electrochemically detecting the presence in solution of certain anions.

Further objects of the present invention are to provide means for providing an output signal voltage related to the activity in solution of anions selected from the group consisting of nitrate, perchlorate, iodide, chlorate and bromide; to provide a sensing electrode sensitive to the foregoing ions in a stable, reproducible manner; and to provide an electrode of the type described which readily detects and measures ion activity in substantially real time without materially affecting the composition of the solution under test.

To effect the foregoing objects, generally there is provided an electrode comprising a container supporting both a body of ion exchanger liquid and a body of electrolyte substantially immiscible with one another. The two bodies are in contact with one another either at a common interface or through the pores of a porous spacer. Means are provided for electrically contacting the electrolyte at a fixed contact potential. In a preferred embodiment there is also provided a porous barrier, one side of which is in contact with the ion exchanger liquid, the other side of which is adapted to contact a solution under test. The ion exchanger liquid preferably comprises the salt of a large neutral ligand having a heavy metal ion complexed therewith.

Figure 2:
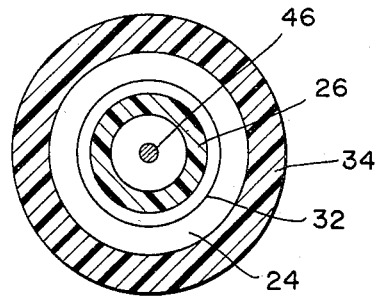

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present inention, reference should be had to the following detailed description taken in connection with the accompanying drawing wherein:

FIG. 1 is an elevational cross-sectional view through the operative portion of an electrode of the present invention; and FIG. 2 is a cross-section taken along the line 2—2 of FIG. 1.

Referring now to FIG. 1 there is shown an embodiment of an electrode of the present invention comprising a container such as tubular body 20. Body 20 preferably encloses two volumes or reservoirs 22 and 24, the former being centrally located and the latter being a coaxial chamber about reservoir 22 and separated therefrom by impermeable cylindrical wall 26. Body 20 and wall 26 are formed of electrically insulating material substantially chemically inert to both the the electrolyte and the ion exchanger liquid. Typically, body 20 is made of a synthetic polymer such as polypropylene, ordinary high resistivity glass, or the like. In assembled form, reservoir 22 contains a body of electrolyte 28 and reservoir 24 contains a body of ion-exchanger liquid 30.

The term "ion exchanger liquid" as used herein is intended to refer to a liquid having having ion exchanger therein, either being a liquid ion-exchanger per se or a normally solid ion-exchange material dissolved in a suitable organic solvent. Ion exchange, of course, then can occur at an interface between two immiscible phases (the ion-exchanger liquid and the solution under test) by a methathetical reaction.

The ion-exchanger liquid in the present invention is a particular organic ion-exchange material dissolved in an organic solvent to provide a liquid that is substantially immiscible with water.

The ion-exchange material is a salt formed of two ions, an anion $X^-$ (such as $NO_3^-$, $ClO_4^-$, $I^-$, $ClO_3^-$, $Br^-$ and the like) and a cation $MO_x^{+n}$, wherein M is an ion of a transition metal (a group VII element such as $Ni^{++}$, $Fe^{++}$, $Co^{++}$ or others such as $Cu^{++}$ and $Cd^{++}$, and the like) complexed with a large neutral ligand O, $n$ being the numerical value of the charge on the metal ion, and $x$ being the number of ligands bound to each metal ion.

The preferred ligands have the general formula

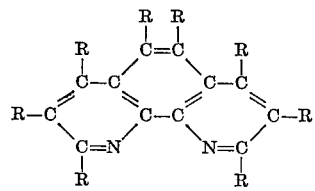

where the R groups can be alkyl or aryl substituents as may be desired to render the ligand soluble in an organic solvent but insoluble in water.

Exemplary ligands are tris-bathophenanthroline (4,7, diphenyl-1, 10-phenanthroline) and substituted 1,10, orthophenanthroline. Typically, the ligand forms a complex that is quite stable and in which the net sum of charges are positive. This implies that the anion $Z^-$ forming the salt $MO_x^{+n}Zn$ will exchange with other anions. The metal ion in the complex must have a low rate constant for exchange relative to the rate of exchange of the anions. Further, the metal-ligand complex must be stable in contact with water, i.e., will not hydrolyze or dissociate. Lastly, the salt of the complex must have high solubility in an organic solvent and very low solubility in aqueous phase, in order to obtain a favorable extraction constant.

One example of a suitable salt is ferrous trisbathophenanthroline nitrate in which the ferrous ion is believed to be bonded to the nitrogen atoms of the ligand to form octahedral complexes. Thus three molecules of the difunctional bathophenanthroline are believed to be involved in the complex. This nitrate salt is readily soluble in nitrobenzene but that latter may be undesirable because of its high vapor pressure and toxicity. It is also soluble in decanol and dioctyl phenyl-phosphonate (DOPP). The preferred solvents are nitrated aromatics such as paranitrocymene which has a low vapor pressure and is not highly toxic. In any event, the solvent should exhibit as low a miscibility with water as possible.

However, the ferrous complex described above while quite stable over short periods tends to be unstable over long periods, apparently because the ferrous ion becomes oxidized to the ferric state. The ferric complex is not desirable because the ferric ion tends to hydrolyze in contact with water, forming $Fe(OH)_3 \cdot XH_2O$ precipitates thereby destroying the complex.

Hence, a preferred example of a suitable salt is the salt of nickel$^{II}$ trisbathophenanthroline in which the $Ni^{++}$ does not oxidize on standing. Similarly, a cobalt$^{II}$ trisbathophenanthroline salt is a suitable exchanger. The solvents mentioned above are also useful with these exchangers.

A typical exchanger salt is prepared as follows: to 200 ml. of chloroform there is added 3.49 grams of nickel (II) chloride hexahydrate. The mixture is refluxed to remove water from the hydrate. To the mixture one then adds 14.15 grams of bathophenanthroline and 1 liter of p-nitrocymene. The resulting mixture is boiled until the nickel (II) chloride has gone into solution ostensibly as the compound nickel (II) (bathophenanthroline)$_3$ Cl$_2$. Any remaining chloroform is removed by further boiling at a temperature of 130-140° C. The solution is then cooled and extracted with successive 500 ml. portions of 0.5 M NaNo$_3$ until the aqueous layer gives no precipitate with AgNO$_3$ solution.

The other salt exchangers are made in a similar manner using appropriate chlorides of the metals as the starting materials.

Both reservoirs 22 and 24 are open at least at one end of each, these open ends terminating in a substantially common plane. Across and in sealing relation to the inner reservoir 22 is membrane 32, a sheet of electrically insulating material, substantially chemically inert to electrolyte 28, exchanger liquid 30 and the test solution it is intended to contact. The membrane further contains a multiplicity of voids or pores, a number of which are interconnected within the membrane and open to the membrane surfaces and edges, thereby providing a plurality of liquid conduits of minute dimensions. The membrane material also is of the type which is preferentially wettable by the ion-exchanger liquid phase. Because in the form shown, membrane 32 is dimensioned so that its peripheral portions are in contact with ion-exchanger liquid 30, its pores tend to be filled by capillarity with liquid 30. Thus a liquid-liquid contact is formed between liquid 30 and electrolyte 28 at or near the inner surface of membrane 32 contacting reservoir 22. Materials from which suitable membranes can be formed are cellulose acetate, polyethylene, polyvinyl acetate and the like. The membrane is preferably quite thin, being in the range of about 3 to 10 mil inches in thickness.

As means for retaining membrane 32 in proper relation to reservoirs 22 and 24 and for forming part of the wall of reservoir 24, there is provided cap 34, threadingly engaged across the open ends of the reservoirs and to body 20. Cap 34 has a small central aperture 36 providing communication from the exterior of the electrode to a surface portion of membrane 30 opposite to the surface of the latter in contact with electrolyte 28. The cap is formed of the same material as body 20.

Passageways 38 and 40 are provided respectively between reservoir 22 and the exterior of the electrode, and reservoir 24 and the electrode exterior so that the reservoirs can be filled with appropriate fluids without removing cap 34. Plugs 42 and 44 are included respectively to releasably seal passageways 38 and 40.

Lastly, extending through body 20 from the exterior thereof to a position within reservoir 22 so as to contact electrolyte 28 is reference electrode 46, i.e. means providing an electronically conductve path from the electrolyte and exhibiting a stable contact potential with the electrolyte. Such a reference electrode is well known in the art and for example is a standard Ag-AgCl electrode where electrolyte is for example a saturated aqueous solution of KCl. The electrolyte can be any of a number of known internal reference solutions.

The electrode is used simply by immersing cap 34 into the solution under test until the latter contacts membrane 32 through aperture 36. Due to ion exchange at the interfacial surface between the ion-exchange liquid in the membrane and the test solution, a Nernst potential arises. As well known, if the test solution is also in contact with the usual reference half-cell such as a calomel electrode, the potential between the two half-cells can be readily determined by the usual potentiometric device.

To measure nitrate (which is exemplary of a number of ions) of course it is preferred to use the nitrate of the complex at the exchanger material. The electrode will respond to the activity of unbound nitrate ions in the test solution but not to nitrate ions that are bound to complexing agents such as lead. The response is to nitrate activities from about $10^{-1}$ to $10^{-5}$ M. Precision is limited by temperature, drift and noise, but with frequent calibration, measurements are usually reproducible to about ±1% of the nitrate activity of the sample.

The metal-ligand complex, preferably but not necessarily, is the salt or the same anion as the anion of interest in the test solution or sample. This avoids problems of initial drift that might occur until the anions of the exchanger are exchanged completely with the different anions of the test solution.

Generally, the electrode of the present invention exhibits Nernst potential behaviour in accordance with the following:

(1) $$E = K - 2.3RT/F \log A$$

where:
E is the total measured potential of the system;
K is a constant dependent on the choice of reference electrodes and electrolyte;
$2.3RT/F$ is the Nernst factor (59.16 mv. at 25° C.); and
A is the activity in the test sample of the anion of interest.

In mixed anion solutions, the electrode response is given by (2) $$E = K - 2.3 \left(\frac{RT}{F}\right) \log (A + iC^{1/n})$$

where C is the concentration of the interfering anion, $n$ is the valence state of the latter, and $i$ is the selectivity constant of the interfering anion.

Selectivity constants for use with electrodes having a salt of nickel trisbathophenanthroline as the exchanger, based upon an arbitrary value of $i$ of unity for $NO_3^-$ are as follows.

Ion: $i$
- $ClO_4^-$ ---------------------------------- $10^3$
- $I^-$ ---------------------------------- 20
- $ClO_3^-$ ---------------------------------- 2
- $NO_3^-$ ---------------------------------- 1
- $Br^-$ ---------------------------------- 0.9

Other common anions such as $S^=$, $NO_2^-$, $CN^-$, $HCO_3^-$, $Cl^-$, $CO_3^=$, $S_2O_3^=$, $SO_3^=$, $F^-$, $SO_4^=$, $H_2PO_4^-$ and $PO_4^=$ all have considerably smaller selectivity constants.

From the foregoing it will be seen that the selectivity of the electrode at equilibrium is 1000/1 for $ClO_4^-$ over $NO_3^-$, 20/1 for $I^-$ over $NO_3^-$ etc. The selectivity of the electrode for $NO_3^-$ over some of the "other common anions" listed is about 13/1. for $CN^-$ and with respect to anions such as $H_2PO_4^-$ is as great as almost 3000/1. These electrodes reach an equilibrium potential reflecting ion activity quite rapidly. For example, an electrode formed of nickel tri-bathophenanthroline perchlorate in paranitrocymene will substantially reach its equilibrium potential with respect to a test solution of sodium perchlorate in water within about 30 seconds.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An electrode sensitive to ions in solution and comprising in combination
   - a container;
   - an ion-exchanger liquid disposed in said container and including a salt of a complex of a liquid and an ion of a transition metal whereby said complex has a net positive charge, said salt being substantially soluble in an organic solvent and substantially insoluble in water;
   - means forming an electrical contact with said liquid at a fixed contact potential; and
   - means for forming an interface between said liquid and said solution.

2. An electrode as defined in claim 1 wherein said ligand has the general formula

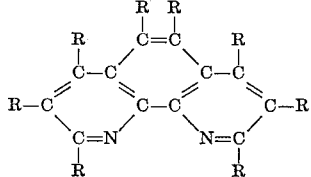

wherein R is selected from the groups consisting of alkyl and aryl, substituted and unsubstituted.

3. An electrode as defined in claim 1 wherein said ligand is selected from the group consisting of bathophenanthroline and orthophenanthroline and said metal ion is selected from the group of ions consisting of $Ni^{++}$, $Co^{++}$, $Fe^{++}$, $Cu^+$ and $Cd^{++}$.

4. An electrode as defined in claim 1 including an organic solvent in which said salt is dissolved, said solvent being substantially immiscible with water.

5. An electrode as defined in claim 4 wherein said organic solvent is a nitrated aromatic compound.

6. An electrode as defined in claim 5 wherein said solvent is paranitrocymene.

7. An electrode as defined in claim 4 wherein said ligand-metal ion complex is nickel trisbathophenanthroline.

8. An electrode as defined in claim 1 wherein said salt is selected from the group consisting of perchlorate, iodide, chlorate, nitrate and bromide.

References Cited

UNITED STATES PATENTS

| 3,406,102 | 10/1968 | Frant et al. | 204—195 |
| 3,429,785 | 2/1969 | Ross | 204—1.1 |

T. H. TUNG, Primary Examiner

U.S. Cl. X.R.

204—1